United States Patent [19]
Altenhöner et al.

[11] 4,062,529
[45] Dec. 13, 1977

[54] APPARATUS FOR THE DIRECT REDUCTION OF IRON ORE TO SPONGE IRON

[75] Inventors: Klaus Altenhöner, Gahlen; Walter Jansen, Mulheim; Klaus Knop, Oberhausen, all of Germany; Jan G. Reering, Rio de Janeiro, Brazil

[73] Assignee: Thyssen Purofer GmbH, Dusseldorf, Germany

[21] Appl. No.: 641,619

[22] Filed: Dec. 17, 1975

[30] Foreign Application Priority Data

Dec. 18, 1974 Germany .............................. 2459876

[51] Int. Cl.$^2$ ........................................... C21B 13/02
[52] U.S. Cl. ..................................... 266/156; 266/197
[58] Field of Search ..................... 75/35; 266/156, 197

[56] References Cited
U.S. PATENT DOCUMENTS 2,929,703 3/1960 Agarwal et al. ................. 266/156 X
3,767,379 10/1973 Marion .............................. 266/156 X
3,799,521 3/1974 Celada et al. .................... 266/156 X
3,905,806 9/1975 Cruse, Jr. et al. ................ 266/156 X
3,909,244 9/1975 Rose et al. ........................ 266/156 X Primary Examiner—Roy Lake
Assistant Examiner—Paul A. Bell
Attorney, Agent, or Firm—Karl F. Ross

[57] ABSTRACT

In a shaft furnace for the direct reduction of iron ore in which hot reducing gas is introduced at the bottom of the furnace and removed from the top of the furnace, means for recirculating at least a portion of the furnace exhaust gas are provided along with means for introducing fresh gas into the recirculated gas stream and means to heat the gas stream introduced into the furnace. The improvement comprises providing means for desulfurizing the fresh gas stream prior to its joining the recycled exhaust gas and providing for dust removal, sulfur and CO removal in the recycled gas stream prior to its joining the fresh gas stream.

5 Claims, 1 Drawing Figure

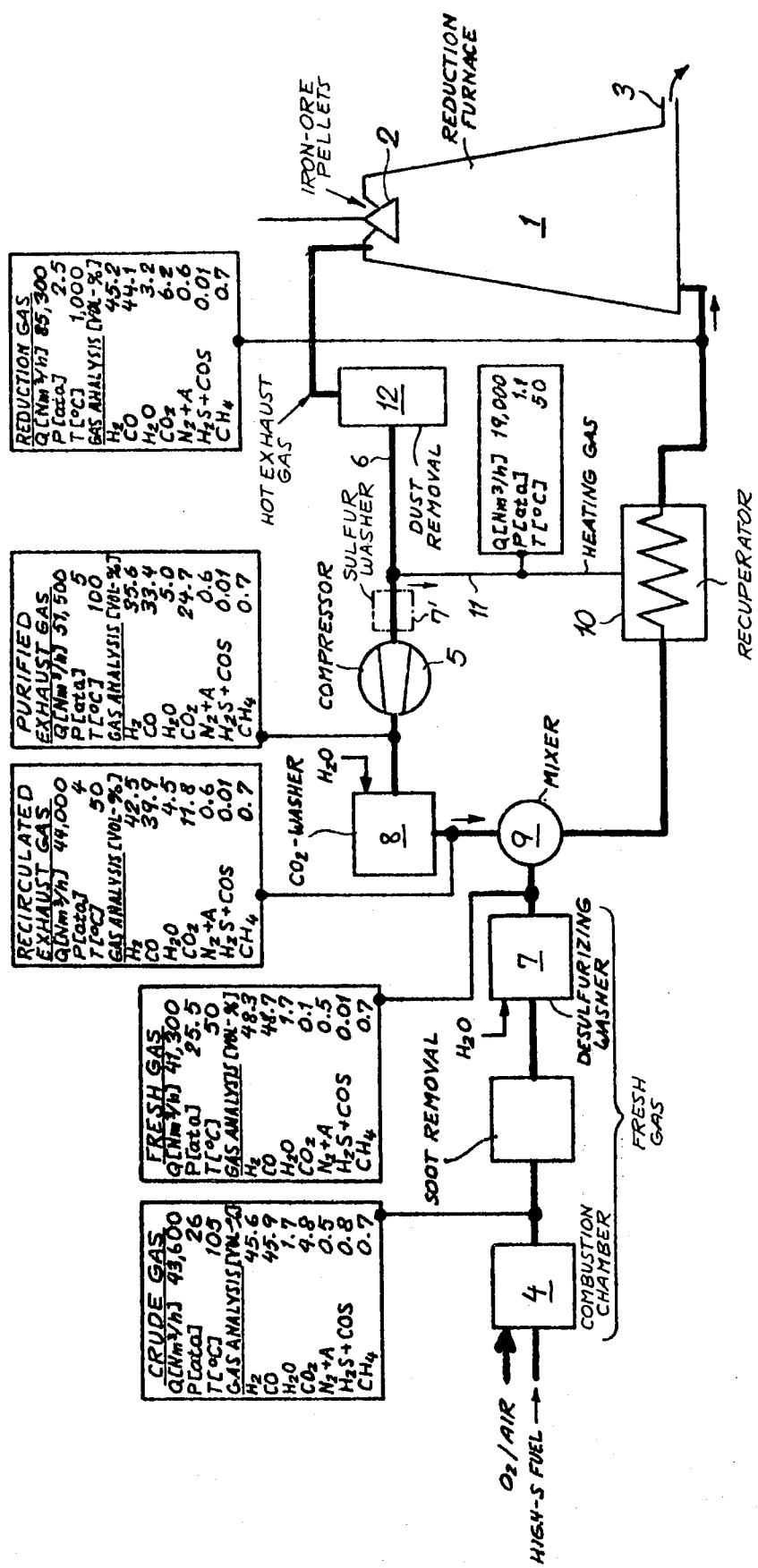

APPARATUS FOR THE DIRECT REDUCTION OF IRON ORE TO SPONGE IRON

FIELD OF THE INVENTION

Our present invention relates to an apparatus for the production of sponge iron by the direct reduction of iron ore, especially in the form of iron-ore pellets, in a shaft-type reducing furnace in which the iron-ore pellets are introduced at the head of the furnace and sponge iron is withdrawn from the base thereof, the iron ore passing downwardly against a rising stream of a hot reducing gas consisting predominantly of carbon monoxide and hydrogen.

BACKGROUND OF THE INVENTION

Direct-reduction plants for the production of sponge iron from iron ore have gained increasing importance in recent years because the direct reduction process eliminates the need for blast furnaces, can be carried out at relatively low cost with long-life equipment, and produces a relatively high-purity product which can be utilized in steel-making processes directly, i.e., without smelting and refining before being introduced into the steel-making process.

The process is also advantageous since it does not require the use of limestone or slag-generating materials in the reduction stage.

As described in U.S. Pat. No. 2,740,706, the reducing gas can be produced from the furnace exhaust gas which is recirculated from the head of the furnace to a gas generator in which a partial combustion of a hydrocarbon fuel is carried out. Generally the recirculation cycle includes a moisture or water remover (demister) to eliminate excess water vapor or condensed moisture from the recirculated exhaust gas before it enters into a converter in which the partial oxidation takes place. The reaction involves the transformation of a carbon-containing energy carrier and oxygen, with residual carbon dioxide in the recirculated exhaust gas, into a gas stream consisting predominantly of hydrogen and carbon monoxide.

In the event the fuel for this latter process contains sulfur, there is always the danger that sponge iron, produced by the process will be contaminated with substantial quantities of sulfur which may detrimentally effect the steel-making process and the quality of the steel produced therein. Of course it is possible to reduce the sulfur level in the hot reducing gas produced by the conventional process, e.g. by using sponge iron as an adsorber for the sulfur before it is introduced into the reducing furnace, but this has the disadvantage that it produces a sulfur-contaminated product and has thermodynamic disadvantages for the metallurgical process taken as a whole.

Because of these limitation it has not been possible heretofore to use high-sulfur hydrocarbon fuels and, generally speaking, the fuels have been the lower hydrocarbons such as methane or ethane (e.g. natural gas).

OBJECTS OF THE INVENTION

It is the principal object of the present invention to provide an improved plant for the production of sponge iron from iron ore, especially in the form of iron-ore pellets, whereby the aforementioned disadvantages can be obviated.

It is also an object of this invention to provide an improved apparatus for carrying out the process described in the commonly assigned copending application Ser. No. 641,618 filed concurrently herewith and entitled PROCESS FOR THE PRODUCTION OF SPONGE IRON.

Another object of the invention is to provide an apparatus for the direct reduction of iron ore, especially in the form of iron ore pellets, with a reducing gas which is independent of the sulfur content thereof and is highly efficient whether the energy carrier is a hydrocarbon or a solid fuel.

SUMMARY OF THE INVENTION

The above and other objects, as will become apparent hereinafter, are attained in accordance with the invention in an apparatus for the production of sponge iron and the reduction of iron ore, generally in the form of iron-ore pellets, which comprises a shaft-type direct-reduction furnace to which the hot reducing gas is introduced at the bottom from which the exhaust gas is removed from the top, and into which the iron-ore is charged at the top to descend in counterflow to the reducing gas stream. Sponge iron is removed at the bottom of the furnace.

The apparatus, insofar as the conventional elements thereof are concerned, may include means for recirculating at least a portion of the furnace exhaust gas from the gas outlet of furnace, to the gas inlet thereof, means for introducing fresh gas into the recirculated gas stream and means for heating the gas stream introduced into the furnace.

The improvement of the present invention, whereby the aforementioned objects are attained, comprises means for mixing the recirculated exhaust gas with a fresh gas stream formed at least in part by the partial oxidation or combustion of a sulfur containing carbonaceous energy carrier with gaseous oxygen, oxygen enriched air, air and/or another oxygen carrier such as water vapor.

According to an essential feature of the invention, the fresh gas stream is introduced into a desulfurizing unit which is vital to the present invention and washes the sulfur from this fresh gas stream.

Another essential element of the plant according to the invention is a carbon-oxide washing unit in the exhaust gas recirculation path for lowering the carbon oxide content of the recirculated gas by washing, for example, a portion of the carbon dioxide therefrom.

According to an important feature of the invention, the mixer for combining the recirculated exhaust gas with reduced carbon dioxide content with the fresh gas from which sulfur has been removed, is located downstream of the sulfur washing unit in the flow direction of the fresh gas.

Between the mixer and the shaft furnace, according to another essential feature of the invention, the heating means is provided in the form of a reducing gas heating recuperator, the mixed gases which have been individually subjected to washing being heated in the recuperator to the necessary temperature (about 1000° C) at which the reducing gas is introduced into the shaft furnace.

As has been indicated, the reducing gas heating recuperator serves to heat a mixed gas formed by combining cold fresh gas and cold recirculated exhaust gas to a temperature of 1000° C.

It has been found to be possible to carry out the sulfur washing such that the fresh gas and, consequently, the reducing gas has a relatively low sulfur content and the tendency for soot formation to occur in the recuperator (after the starting period) is reduced.

When we refer to sulfur washing and carbon dioxide washing herein, we intend thereby to describe gas-washing processes in which the gas is washed with liquids or vapors in a conventional manner so that the exiting gas is recovered in a cold state. By cold gas we mean gas at a temperature between about 50° and 100° C in most cases.

Of course, since the mixed gas formed by combining the cold fresh gas and the cold recirculated exhaust gas requires reheating, the problem of soot formation which has always plagued the metallurgical field when carbon containing gases are heated, comes to the fore.

In fact, during the heating of the gas mixture the level (concentration) of sulfur in the reducing gas is important and has an effect upon reducing soot formation. It has been found that desulfurization washing operation provides a highly effective way of establishing the proper sulfur level and practically eliminating soot formation in a recuperator, even when the fresh gas is produced by the combustion of a high-sulfur fuel such as high-sulfur heavy oil (residual oil) or even high-sulfur cold or other solid fuel.

The invention is based upon our discovery that it is possible to effect completely satisfactory desulfurization of a fresh gas produced by the partial combustion of hydrocarbons with oxygen or air by a wet sulfur washing. This can be carried out at low temperatures which make the reheating of the mixed gases desirable.

The industry has found that the heating of gases which consist predominantly of carbon monoxide and hydrogen (i.e gases which correspond to the composition of the fresh gas, the recirculated exhaust gas after carbon dioxide washing, or reducing gas) to temperatures of about 1000° C are characterized by the danger of soot formation.

Carbon monoxide is, because of its equilibrium relationship, not stable to temperatures up to about 1100° C but has a tendency according to the BOUDOUARD equilibrium toward the formation of elemental carbon or soot and carbon dioxide. At temperatures below 400° C the elemental carbon formation reaction rate and therefore the speed with which soot formation tends to occur is permissibly small.

At temperatures in the range of 400° C to 800° C, however, the soot-formation rate becomes so high that it results in an intolerable precipitation of elemental carbon.

This is especially pronounced in the presence of catalysts. The catalysts may be any of the metals which have been found to be useful heretofore for recuperators.

It is indeed surprising that, according to the invention, detrimental soot formation upon recuperative heating of the reducing gas can be avoided when the plant includes the above-described essential elements and the sulfur content in the fresh gas is established at a corresponding level.

The desirable sulfur level in the fresh gas can be determined easily with experimentation and dependence upon the concentrations of carbon oxides and water vapor in the recirculated exhaust gas after the carbon oxide washing step.

However, the desired sulfur content in the fresh gas can also be determined theoretically. It has been found to be desirable that the sulfur content in the fresh gas, based upon the carbon monoxide/hydrogen (CO/H$_2$) ratio be established to correspond to the relationship:

$$V_{H_2} = \frac{(a \times V_{H_2SE})}{(e + 1) \times 100}$$

where:

$V =$ volume percentage;
$X =$ molar ratio H$_2$/CO;
$a$ is a coefficient dependent upon the degree of oxidation $\eta_o$;
$e$ is the natural logarithm base and $\eta_o$ is defined by the relationship:

$$\eta_o = \frac{(V_{CO_2} + V_{H_2O})}{(V_{CO_2} + V_{H_2O} + V_{H_2} + V_{CO})}$$

For example, $a = 0.1$ for a pressure of 5 bar and $\eta_o = 0.05$.

Surprisingly, the resulting sulfur content of the fresh gas is so low that the metallurgical process is not at all affected, in spite of the fact that the sulfur content is sufficiently high to prevent soot formation.

In fact, even with recuperative heating and in the presence of catalytically effective heat exchanger surface, carbon monoxide decomposition in the gas to be heated is reduced or eliminated.

The sulfur in the fresh gas is generally in the form of hydrogen sulfide and with continuous hydrogen sulfide influx there is a possibility of poisoning of the catalyst.

Since the reducing formation is used for the reduction of iron ore, the hydrogen sulfide entrainment in the reducing gas should, it will be understood, be held as low as possible. This can be achieved by establishing a predetermined carbon dioxide and water vapor residual content of 2 to 6 volume percent in the gas to be heated.

It has been found that these residual levels of carbon dioxide and water vapor result in a greater reduction of the hydrogen sulfide than would normally be expected.

According to the invention, the sulfur content in the fresh gas and the carbon-oxide content of the recirculated exhaust gas, before mixing of the two gases, should be adjustable. This adjustability is not a problem and can be effected by adjusting the wash-water quantities or gas-residence time in the washing columns for the sulfur washing and carbon oxide washing units. If required the recirculated exhaust gas path can also include a sulfur-washing stage to avoid noncontrolled sulfur enrichment of the recirculated gases.

According to the invention the recuperator is heated to provide the heat necessary to raise the reducing gas (mixed gas) to the necessary reduction temperature. The heating can be effected in various ways. For example, energy from a foreign source, e.g. in the form of hot gas produced in a burner chamber elsewhere and passed through the recuperator, can be used. However, it preferred to heat the recuperator with exhaust gas withdrawn from the reducing furnace. In this case, the portion of the exhaust gas which is used to heat the recuperator can be burned with oxygen or air to increase its heat content.

It will be understood that the apparatus can be operated at a pressure which is compatible with that at which the shaft furnace functions optimally. Thus if a superatmospheric pressure is maintained in the shaft furnace, the exhaust gas recirculation and fresh gas generation may be effected under a corresponding pressure and the various ducts for displacing the exhaust gas or generating or feeding the fresh gas can be provided with compressors for this purpose.

BRIEF DESCRIPTION OF THE DRAWING

The above and other objects, features and advantages of the present invention will become more readily apparent from the following description, reference being made to the sole FIGURE of the accompanying drawing which represents a flow-diagram illustrating a plant for the reduction of iron ore pellets according to the invention.

SPECIFIC DESCRIPTION

The plant according to the present invention basically comprises a shaft furnace 1 having a charging device 2 through which pellets can be introduced from above into the furnace and which serves to seal the latter to maintain an elevated pressure in the shaft furnace as may be desired. At its base, the shaft furnace is provided with a discharging device generally represented at 3 by which the reduced or sponge iron can be withdrawn.

As gas generator 4 is supplied with a hydrocarbon fuel or some other carbon-containing energy carrier is a high-sulfur hydrocarbon such as heavy oil (residual oil) and the oxygen carrier is oxygen or air, oxygen-enriched air, or oxygen carriers such as water vapor in which the oxygen is in a combined form.

A unit 5, e.g. a compressor, is provided to circulate a portion of the furnace exhaust gas from the top of the furnace 1 as will be described below.

The gas generator 4 is provided upstream of a desulfurizing washer 7 for the fresh gas, and a mixer 9 in which the fresh, desulfurized and cooled gas is mixed with the recirculated exhaust gas from the compressor 5.

Upstream of the mixer 9 and between the latter and the compressor 5, there is provided a carbon-oxide washer 8 adapted to remove carbon dioxide from the recirculated portion of the furnace exhaust gas and thereby reduces the carbon dioxide content thereof by approximately 10 volume percent.

The product of the mixer 9 is the cold mixed gas (reduction gas) which is heated in a reduction gas heating recuperator 10.

The recirculated portion of the exhaust gas, as a result of washing at 8, and the fresh gas produced at 4, as a result of washing at 7, are both mixed in the mixer 9 in a cold state. Consequently, the recuperator 10 must serve to heat the cold gas mixture to a temperature of about 1000° C before introducing this, now heated reducing gas into the furnace at the bottom thereof to rise against the descending iron-ore pellets.

The sulfur washing step 7 is so adjusted that the fresh gas and therefore the reducing gas produced at the mixer 9 has a lowered sulfur level (than the fresh gas produced by combustion of a high sulfur fuel in the combustion chamber 4), but nevertheless sufficient to prevent soot formation in the recuperator. The adjustment of the gas composition in accordance with the relationship set forth above to prevent soot formation, is also accomplished in part by the carbon dioxide washer. The washer can be adjusted to achieve the correct amount of sulfur and carbon dioxide reduction by appropriate modification of the washing liquid quantities, gas-residence-time and temperature.

When the iron ore to be processed contains significant quantities of sulfur, a further sulfur washing unit 7' similar to that represented at 7 can be provided in the recirculating path 6.

In operation, the recuperator 10 is heated with a portion of the furnace exhaust gas diverted from the dust remover 12 along line 11 to the recuperator. This portion of the exhaust gas may be burned with oxygen to increase the sensible heat of the gas before it is introduced into the recuperator.

In the drawing the pressure P, in absolute atmosphere units, the quantity Q of gas in standard cubic meters per hour and the temperature T of the gas in degrees centigrade at different points in the system in the case of a specific example are given in the tables, the compositions of the gas being likewise given in volume percent.

To the extent necessary, feed lines for the gas may be provided with compressors as may be necessary to maintain the superatmospheric pressure in the system.

The dust remover 12 can be provided in the form of a venturi washer or the like. Unused exhaust gas can be discharged from the apparatus.

In the specific example represented in the tables of the drawing, the fresh gas contains approximately 48 volume percent hydrogen, approximately 48 volume percent carbon monoxide and approximately 0.01 volume percent sulfur in the form of hydrogen sulfide and carbonyl sulfide. The recirculated exhaust gas, after carbon dioxide removal, preferably comprises about 42 volume percent hydrogen, about 40% volume carbon monoxide, about 5 volume percent washer and about 12 volume percent carbon dioxide. These compositions have been found to provide optimum heating of the mixed gas without soot formation in the recuperator.

We claim:

1. An apparatus for the direct reduction of iron ore, especially iron-ore pellets, comprising in combination a shaft furnace for reducing the iron ore to iron with a reducing gas:

exhaust-gas circulating means for recirculating exhaust gas from said furnace to the latter as part of a reducing gas supplied thereto;

a gas generator for the partial combustion of a carbon-containing and sulfur-containing energy carrier with oxygen, air or an oxygen carrier to form a fresh gas;

a mixer for mixing said fresh gas with a portion of the recirculated exhaust gas;

a desulfurizing washer disposed between said gas generator and said mixer for removing at least a portion of the sulfur present in said fresh gas and cooling same to a temperature of about 50° C to 100° C;

a carbon-oxide washer upstream of said mixer along said circulating means for removing at least a portion of the carbon dioxide of the recirculated exhaust gas delivered to said mixer; and a recuperator between said mixer and said furnace for heating the mixture of fresh gas and exhaust gas formed in said mixture to a temperature of about 1000° C, thereby forming the reducing gas which is admitted to said furnace at the latter temperature, at least one of said washers serving to adjust the relationship of carbon oxides and sulfur in the mixture to a level limiting soot formation during heating of said mixer in said recuperator, said mixer being provided directly upstream of said recuperator whereby the mixture formed in said mixer enters the recuperator directly upon formation.

2. The apparatus defined in claim 1 wherein said one of said washers is said sulfur washer.

3. The apparatus defined in claim 1 wherein one of said washers is said carbon oxide washer.

4. The apparatus defined in claim 3 wherein said circulating means includes a sulfur washer.

5. The apparatus defined in claim 1 further comprising means for heating said recuperator with said exhaust gas.

* * * * *